United States Patent
Paillasson

(10) Patent No.: US 10,736,408 B2
(45) Date of Patent: Aug. 11, 2020

(54) AUDIO CABLE HOLDER

(71) Applicant: Jean-Pierre Paillasson, Burbank, CA (US)

(72) Inventor: Jean-Pierre Paillasson, Burbank, CA (US)

(*) Notice: Subject to any disclaimer, the term of this patent is extended or adjusted under 35 U.S.C. 154(b) by 0 days.

(21) Appl. No.: 16/296,859

(22) Filed: Mar. 8, 2019

(65) Prior Publication Data
US 2019/0274416 A1    Sep. 12, 2019

Related U.S. Application Data

(60) Provisional application No. 62/640,843, filed on Mar. 9, 2018.

(51) Int. Cl.
| | |
|---|---|
| A45F 5/02 | (2006.01) |
| A44B 1/18 | (2006.01) |
| F16B 1/00 | (2006.01) |
| F16B 2/20 | (2006.01) |

(52) U.S. Cl.
CPC .............. *A45F 5/02* (2013.01); *A44B 1/18* (2013.01); *F16B 1/00* (2013.01); *F16B 2/20* (2013.01); *A45F 2200/0508* (2013.01); *F16B 2001/0035* (2013.01)

(58) Field of Classification Search
CPC ... A44B 1/18; A41D 27/08; A45F 5/02; A45F 2200/0508; A45F 2005/025; F16B 1/00; F16B 2/20; F16B 2001/0035; F16B 2/10
See application file for complete search history.

(56) References Cited

U.S. PATENT DOCUMENTS

| | | | |
|---|---|---|---|
| 5,422,957 A | 6/1995 | Cummins | |
| 5,682,648 A * | 11/1997 | Miller | A45F 5/08 24/303 |
| 5,682,653 A * | 11/1997 | Berglof | G09F 1/10 24/303 |
| 5,845,369 A * | 12/1998 | Dunchock | A45F 5/02 24/3.3 |
| 6,431,500 B1 * | 8/2002 | Jacobs | F16L 3/13 24/129 R |
| 6,658,130 B2 | 12/2003 | Huang | |
| 6,728,556 B1 * | 4/2004 | Whitley | A45F 5/00 455/575.1 |
| 7,665,684 B2 * | 2/2010 | Salentine | A45F 5/004 242/379.2 |
| 8,147,270 B1 | 4/2012 | Wescott | |
| 8,640,266 B2 * | 2/2014 | Best | A44C 15/003 2/104 |
| 8,695,170 B2 * | 4/2014 | Honeycutt | A44C 15/003 24/3.1 |
| 8,841,556 B2 * | 9/2014 | Rothbaum | F16G 11/00 174/111 |

(Continued)

*Primary Examiner* — Robert Sandy
*Assistant Examiner* — Louis A Mercado
(74) *Attorney, Agent, or Firm* — Trojan Law Offices

(57) ABSTRACT

A universal assembly for securing various configurations and designs of audio cables to clothing articles. The universal assembly has a receptor housing and a fastening mechanism. The receptor housing can secure the audio cables to clothing articles in any position on the clothing and also allow the audio cable to be angled in any desired position and orientation. The fastening mechanism can movably secure the receptor housing at any position on a clothing article.

10 Claims, 10 Drawing Sheets

(56) References Cited

U.S. PATENT DOCUMENTS

| | | | | |
|---|---|---|---|---|
| 9,913,526 | B2* | 3/2018 | Abreu | A45F 5/02 |
| 2006/0005361 | A1* | 1/2006 | O'Banion | A42B 1/24 |
| | | | | 24/303 |
| 2006/0282993 | A1* | 12/2006 | Dietz | B43K 23/001 |
| | | | | 24/303 |
| 2011/0056437 | A1* | 3/2011 | Sprung | H01F 7/0252 |
| | | | | 119/51.04 |
| 2014/0033394 | A1* | 2/2014 | Stauffer | A45F 5/02 |
| | | | | 2/69 |
| 2017/0328388 | A1* | 11/2017 | Salvatore | A47G 29/08 |
| 2018/0110266 | A1* | 4/2018 | Lee | F25B 21/04 |
| 2018/0250168 | A1* | 9/2018 | Herring | A45F 5/02 |

* cited by examiner

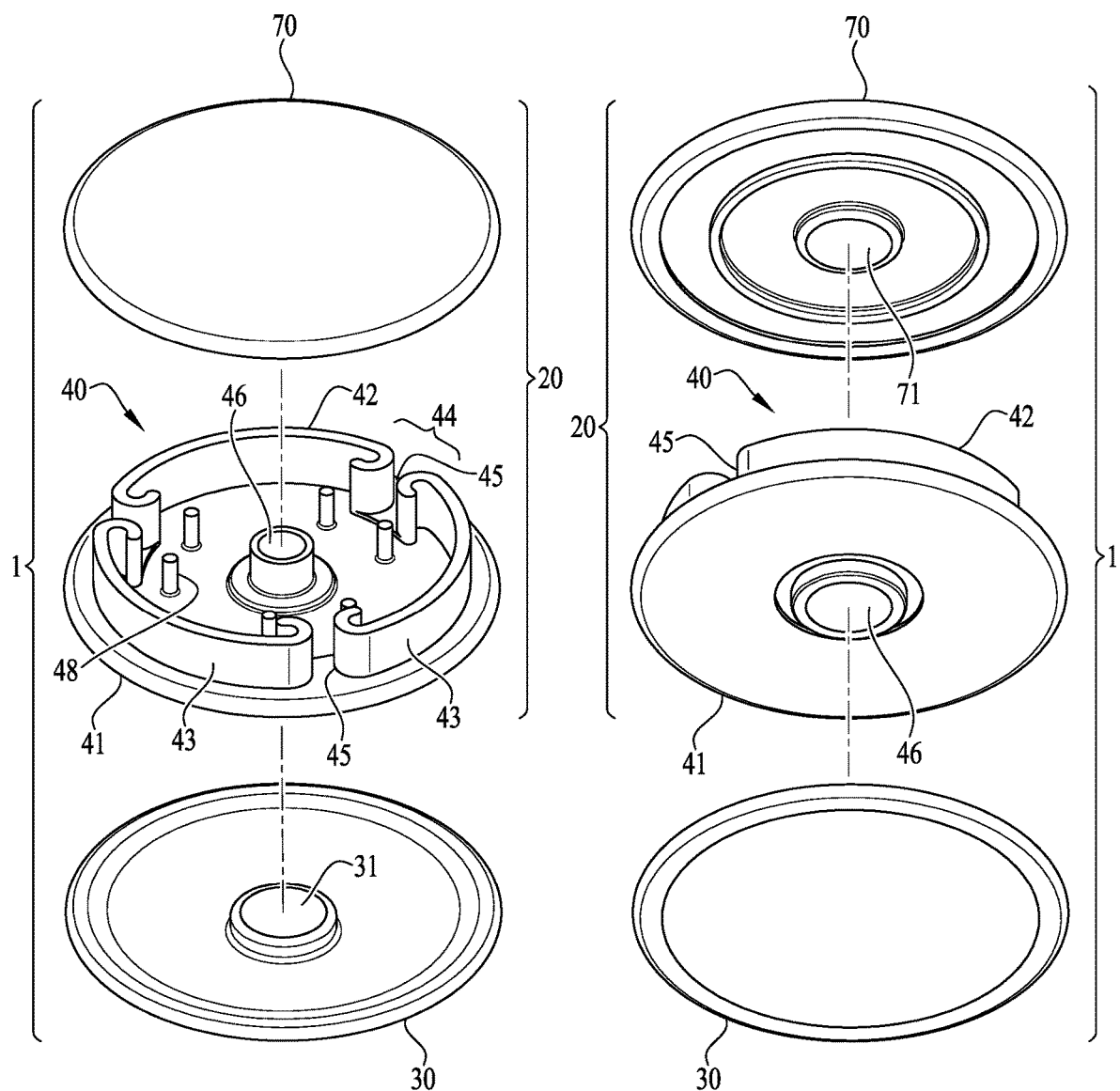

AUDIO CABLE HOLDER

CROSS-REFERENCE TO RELATED APPLICATIONS

This patent claims the benefit of U.S. Provisional Application No. 62/640,843 filed on Mar. 9, 2018, which is incorporated herein by reference in its entirety for all purposes.

TECHNICAL FIELD

The present invention relates to a universal assembly for securing audio cables to clothing. The universal assembly comprises a receptor housing and a fastening mechanism, such as multiple magnets or clips. The receptor housing secures the audio cables to said clothing in any position on the clothing and also allow said audio cable to be positioned in any desired position and orientation.

BACKGROUND

Earbuds, headphones, and earphones (collectively referred to as "earbuds") are common electronic accessories used to consume media during every day routines such as walking, jogging, working, shopping, at the gym, and taking the bus. While earbuds were previously primarily used to listen to music, earbuds can now be plugged into a myriad of electronic accessories such as cellular phones, portable video game systems, portable electronic tablets, and other media consuming devices. Not only are earbuds used to consume media, but headphones now have integrated microphones and play a large role in voice and videos communications. Hence, earbuds have become an important electronic accessory that are commonly carried and used every day in a myriad of circumstances.

A critical aspect of using earbuds is to ensure that the cables connecting the earbuds to each other or the cable connecting the earbud(s) to the portable electronic device does not get tangled in the user's clothing or objects in the user's surrounding environment. Such entanglement could potentially pull out the earbuds, causing at minimum disruption to the user's consumption of media or worse, damage to the earbud itself if it falls on the floor. This is especially important when using earbuds during physical activities, such as running. During physical activities, it is critical that the audio cable remain close to the user's body so that a user's arms, clothing, or environment do not pull do not pull the earbud(s) from the user's ears.

Moreover, since many manufacturers sell a variety of earbuds in different configurations, the needs for securing each type of earbud vary greatly. For example, some earbuds have a single cable linking a single earbud to a device, or just one cable linking the earbuds to each other.

Accordingly, there is a need for a universal invention that supports the audio cable from earbuds of that different designs that can be secured anywhere on a user's clothing.

SUMMARY OF THE INVENTION

The present invention is a universal assembly for removably securing audio cables to clothing. The assembly is generally comprised of a receptor housing for supporting an audio cable and a fastening mechanism that is used to movably secure the receptor housing at any position on a user's clothing.

In one embodiment, the receptor housing has a base comprising a base plate and a peripheral wall located at the edge of said base plate. The peripheral wall has at least two openings in which an audio cable can be inserted. The audio cable is further secured when a base cover is mounted on the peripheral wall to form the enclosure for the receptor housing.

In further embodiments of the invention, the fastening mechanism used to secure the receptor housing to a user's clothing includes a magnet. The fastening mechanism is placed under the user's cloth and the receptor housing is place on the user's clothing directly opposite of the fastening mechanism. Some embodiments have a receptor housing with a complimentary magnet so when that the receptor housing and the fastening mechanism are linked together, the entire assembly is secured on the user's clothing. Since the receptor housing and the fastening mechanism are secured using magnets, the entire assembly is movable to any position on the user's clothing. Moreover, the magnetic linkage means that the receptor housing is rotatable to any position such that the openings can face any direction to facilitate the least obtrusive position for the audio cable.

Other embodiments may comprise of a clip as the fastening mechanism to clip the receptor housing to an article of clothing. The clip may also be fastened to the receptor housing magnetically such that it is rotatable to any position desired by the user.

In addition, some embodiments may have a receptor housing that is further customizable in design, color, and shape. The base cover could be interchangeable and with different colors, logos, and designs.

The receptor housing could integrate other features such as a GPS tracking device for safety, a translucent base cover that can integrate LED lights and/or diode lights that flicker or flashing (for night visibility), glow in the dark or other luminescent material, reflective material, personal alarm, Bluetooth mini stereo speaker with hands-free phone capability, or video recorder.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

BRIEF DESCRIPTION OF THE DRAWINGS

FIG. 2 is a perspective, top-down, exploded view of the assembly according to an embodiment of the present invention.

FIG. 3 is a perspective, bottom-up, exploded view of the assembly according to an embodiment of the present invention.

DETAILED DESCRIPTION OF THE INVENTION

In an embodiment of the present invention, the universal assembly is generally comprised of a receptor housing for supporting an audio cable and a fastening mechanism that is used to movably secure the receptor housing at any position on a user's clothing. So secure the universal assembly, the receptor housing is positioned on a first side of an article of clothing, and the fastening mechanism is positioned on a second side of said article of clothing and aligned opposite to the receptor housing. When so aligned, the receptor housing and fastening mechanism links with said receptor housing so that an audio cable is movably secured to a user's clothing such that said receptor housing is secured at any location that is convenient to the user and the audio cable is least obtrusive. Moreover, in some embodiments the receptor housing and fastening mechanism are linked using magnets, the receptor housing may be rotatable on its center axis by 360 degrees such that said an audio cable can be positioned as desired at any angle on said clothing.

Since earbuds come in various types of styles and options for cabling, the needs of different earbud configurations would mean that the earbud would need to be secured differently. For example, the needs for securing an audio cable with three-prongs (i.e. two earbuds and one earbud jack) would different from the needs for securing an audio cable with only two-prongs (e.g. one earbud and one earbud jack). Hence, the ability to rotate the receptor housing and the ability to move the receptor housing to any position on a user's clothing is critical to allow the user to secure multiple configurations of audio cables for a variety of earbud types.

Referring generally to FIGS. 1 to 5, an embodiment of the universal assembly (1) is comprised of a receptor housing (20) and a fastening mechanism (30) attachable to the receptor housing (20) to secure the receptor housing (20) to an article of clothing (50).

Figure 1:
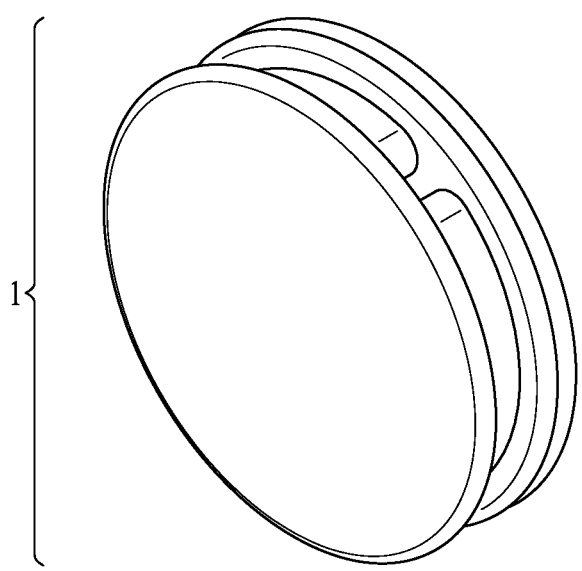
FIG. 1 is perspective view of the assembly according to an embodiment of the present invention.
Figure 4:
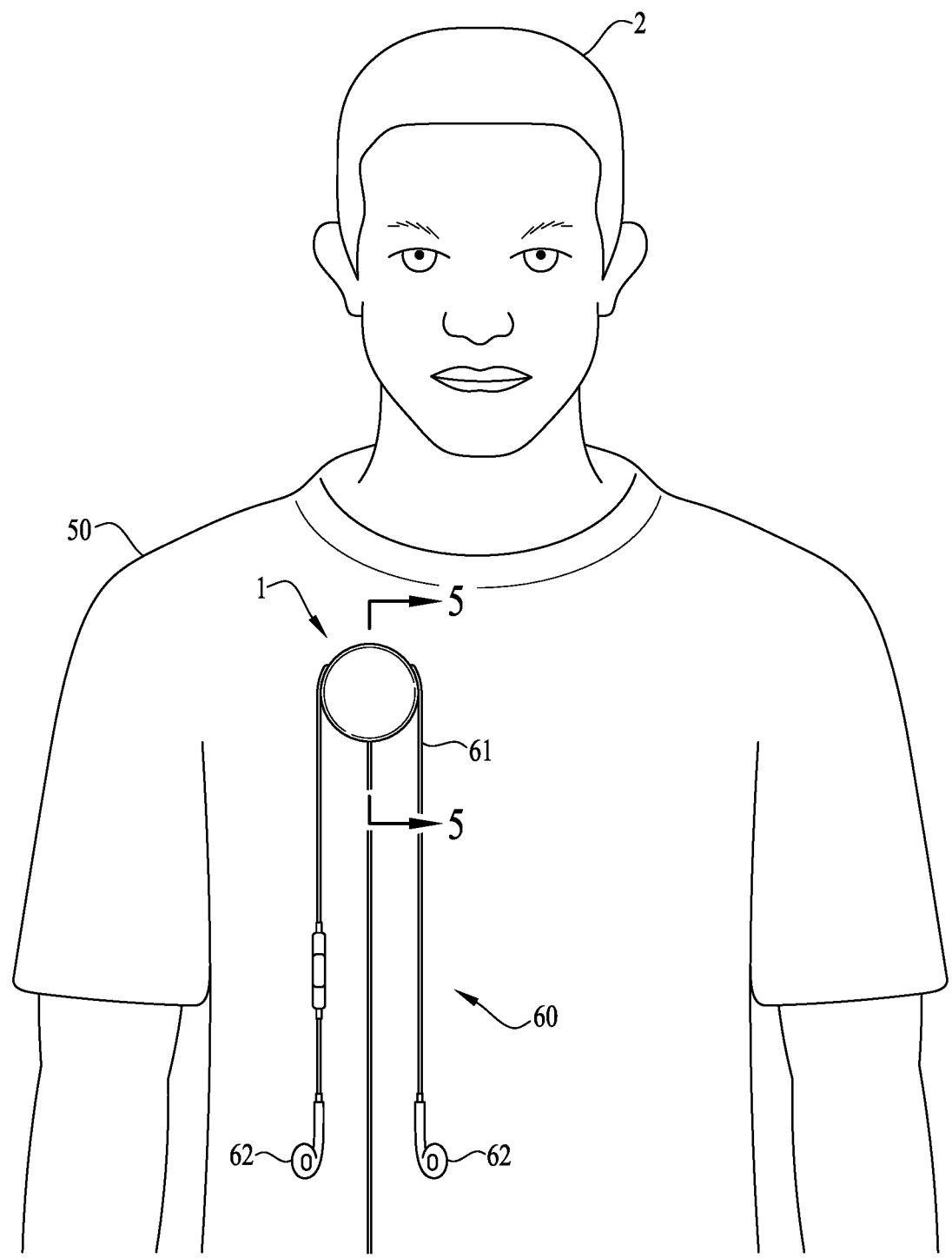
FIG. 4 view of the assembly according to an embodiment of the present invention as secured on a user's clothing.
Figure 5:
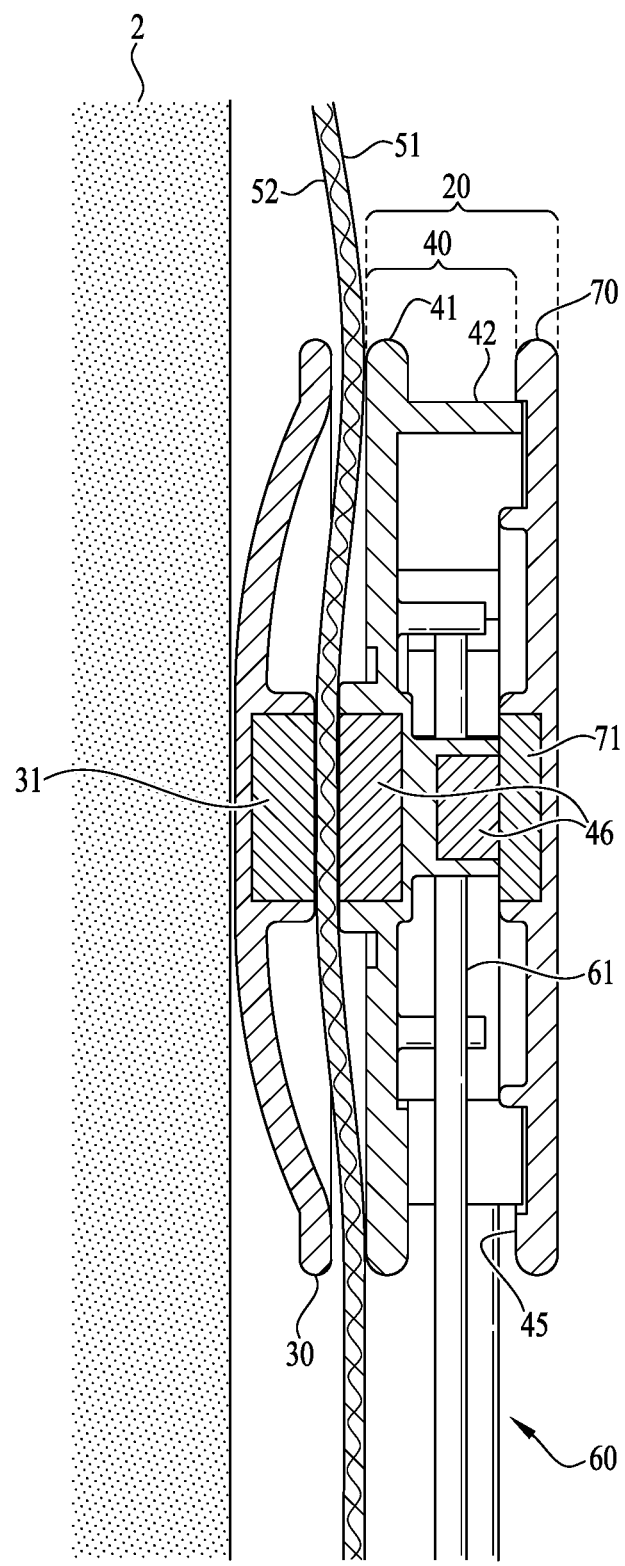
FIG. 5 is a cross-section view of the assembly according to an embodiment of the present invention as secured on a user's clothing.
Figures 6, 7:
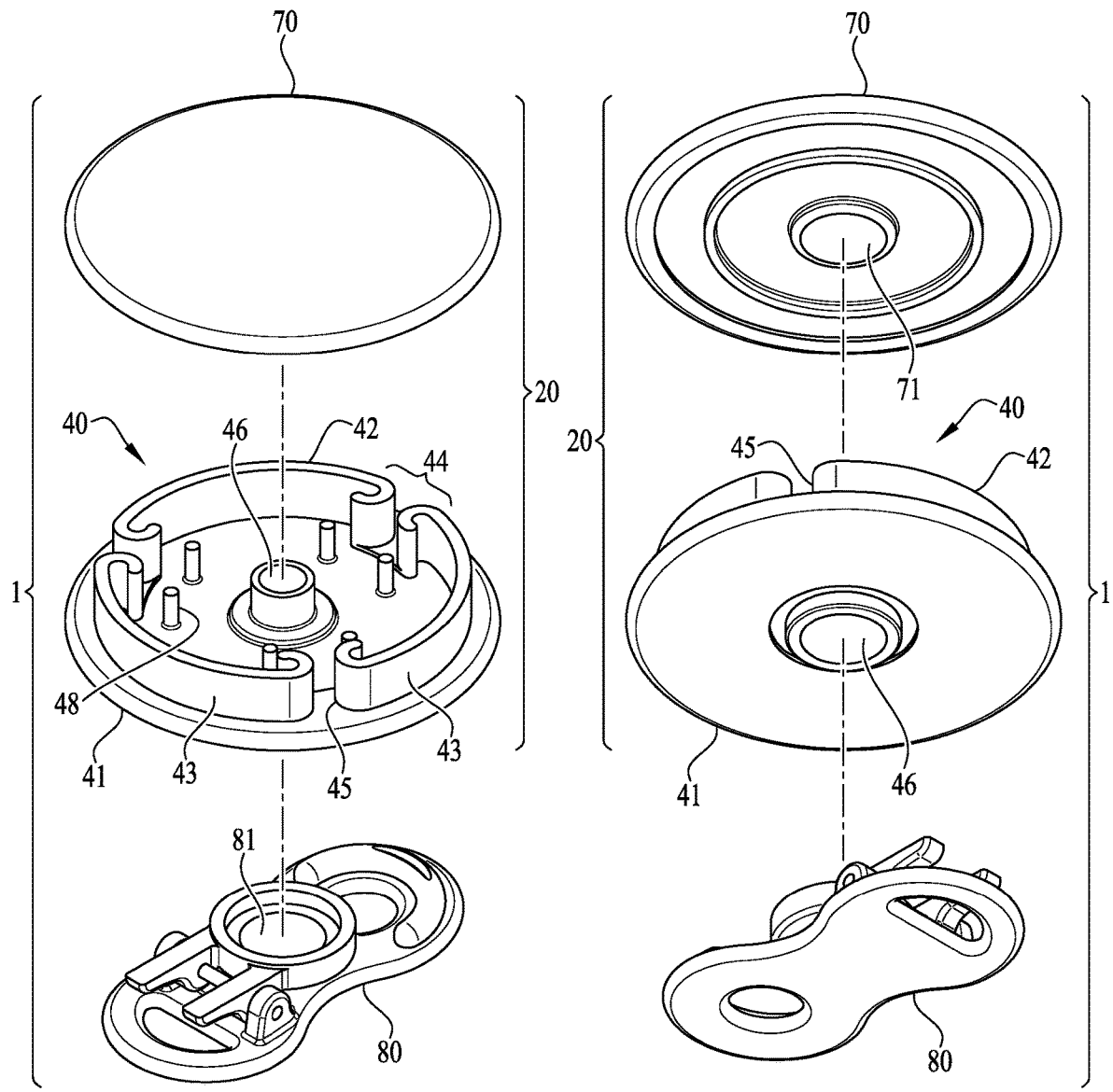
FIG. 6 is a perspective, top-down, exploded view of the assembly according to an embodiment of the present invention with a magnetic clip.
FIG. 7 is a perspective, bottom-up, exploded view of the assembly according to an embodiment of the present invention with a magnetic clip.
Figure 8:
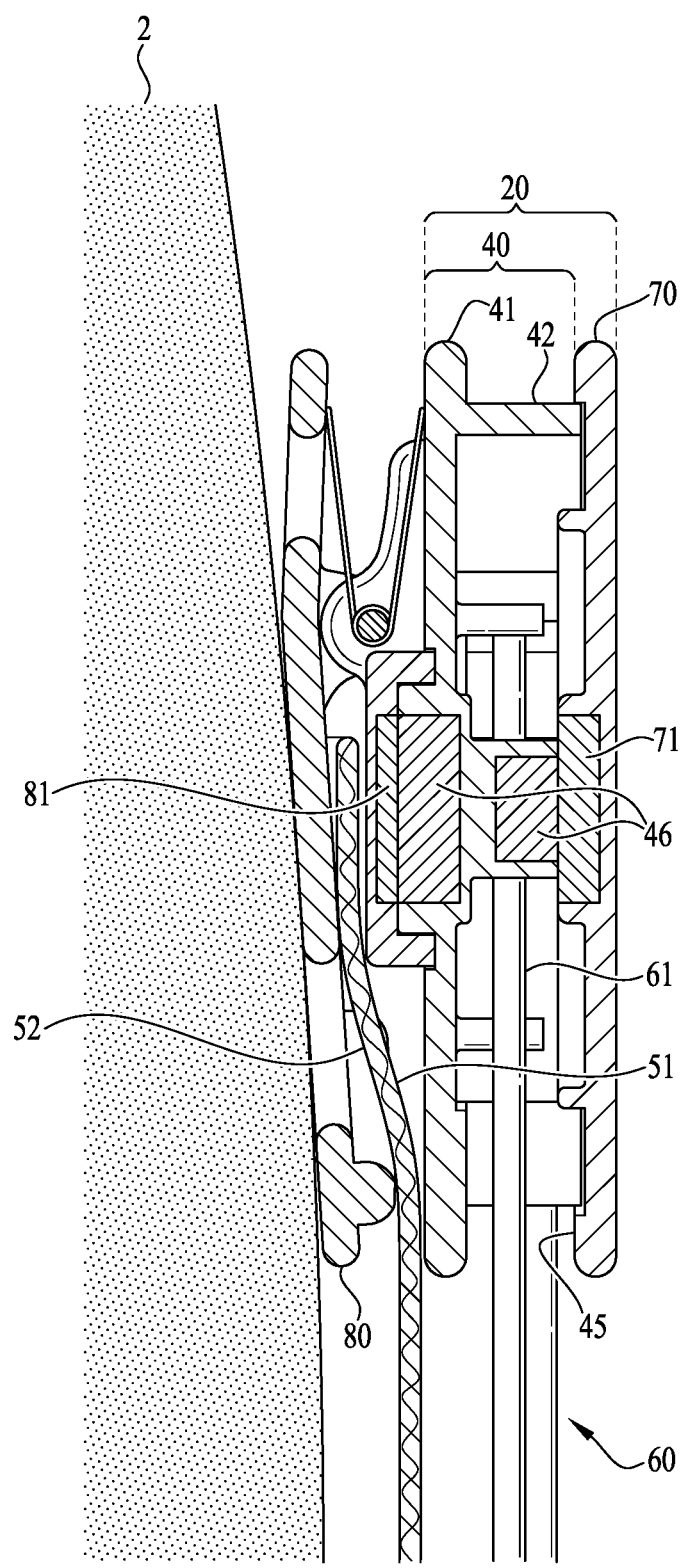
FIG. 8 is a cross-section view of the assembly according to an embodiment of the present invention as secured on a user's clothing with a magnetic clip.
Figure 9:
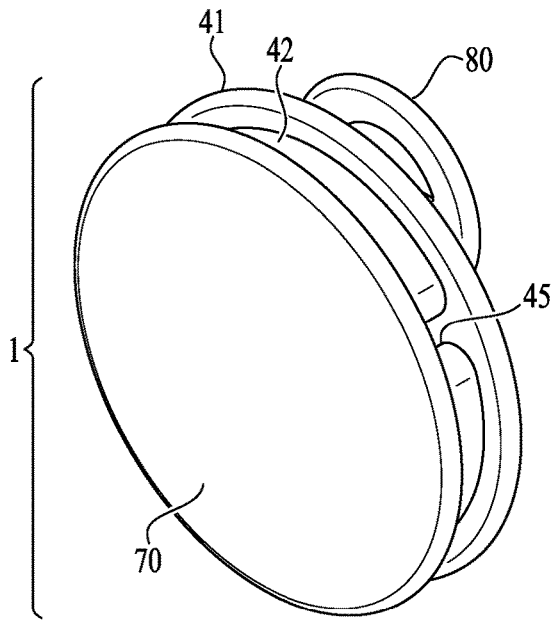
FIG. 9 is front perspective view of the assembly according to an embodiment of the present invention with a fixed clip.
Figure 10:
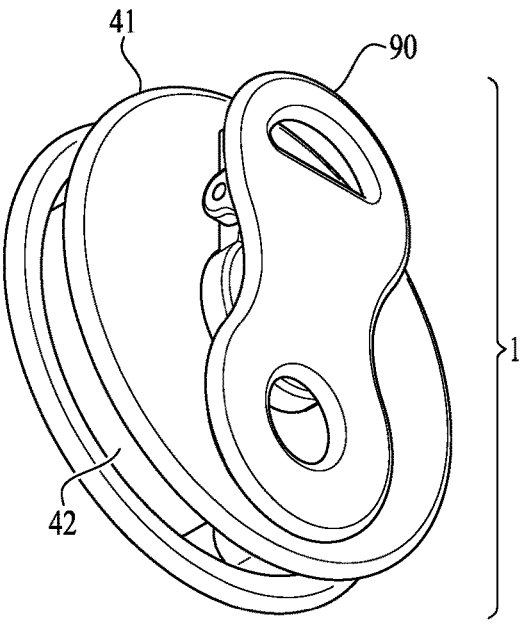
FIG. 10 is back perspective view of the assembly according to an embodiment of the present invention with a fixed clip.
Figure 11:
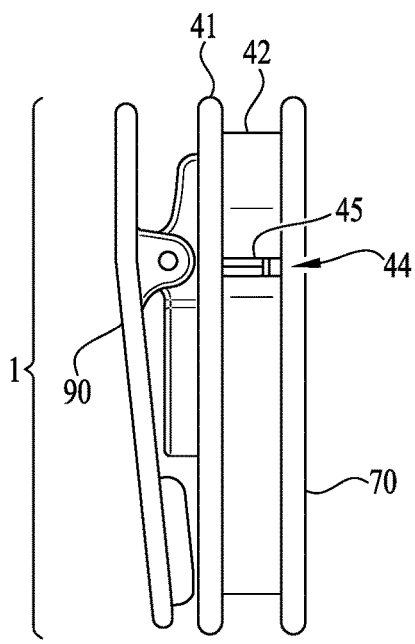
FIG. 11 is side view of the assembly according to an embodiment of the present invention with a fixed clip.
Figure 12:
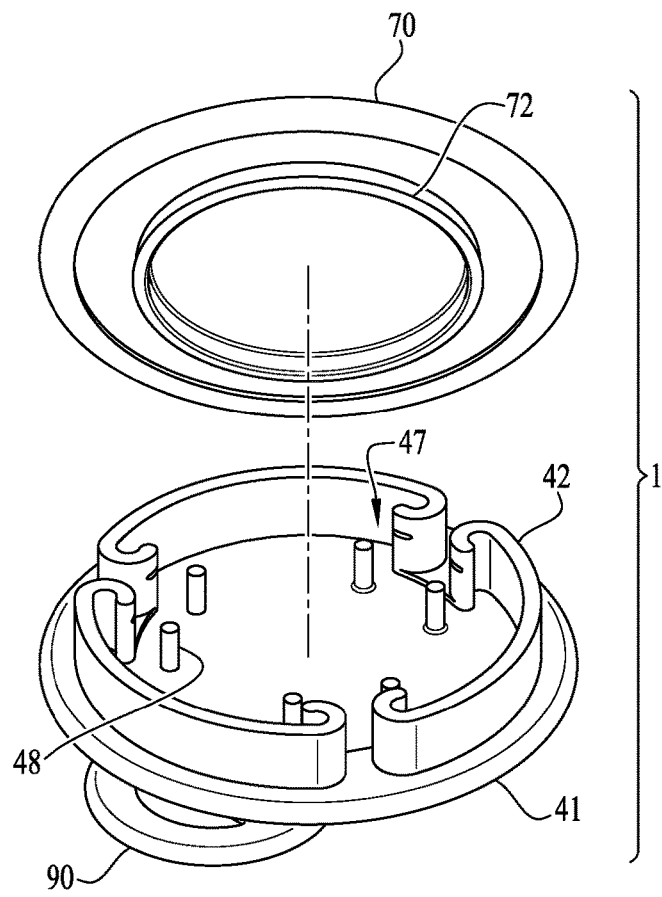
FIG. 12 is an exploded view of the assembly according to an embodiment of the present invention with a fixed clip.
Figure 13:
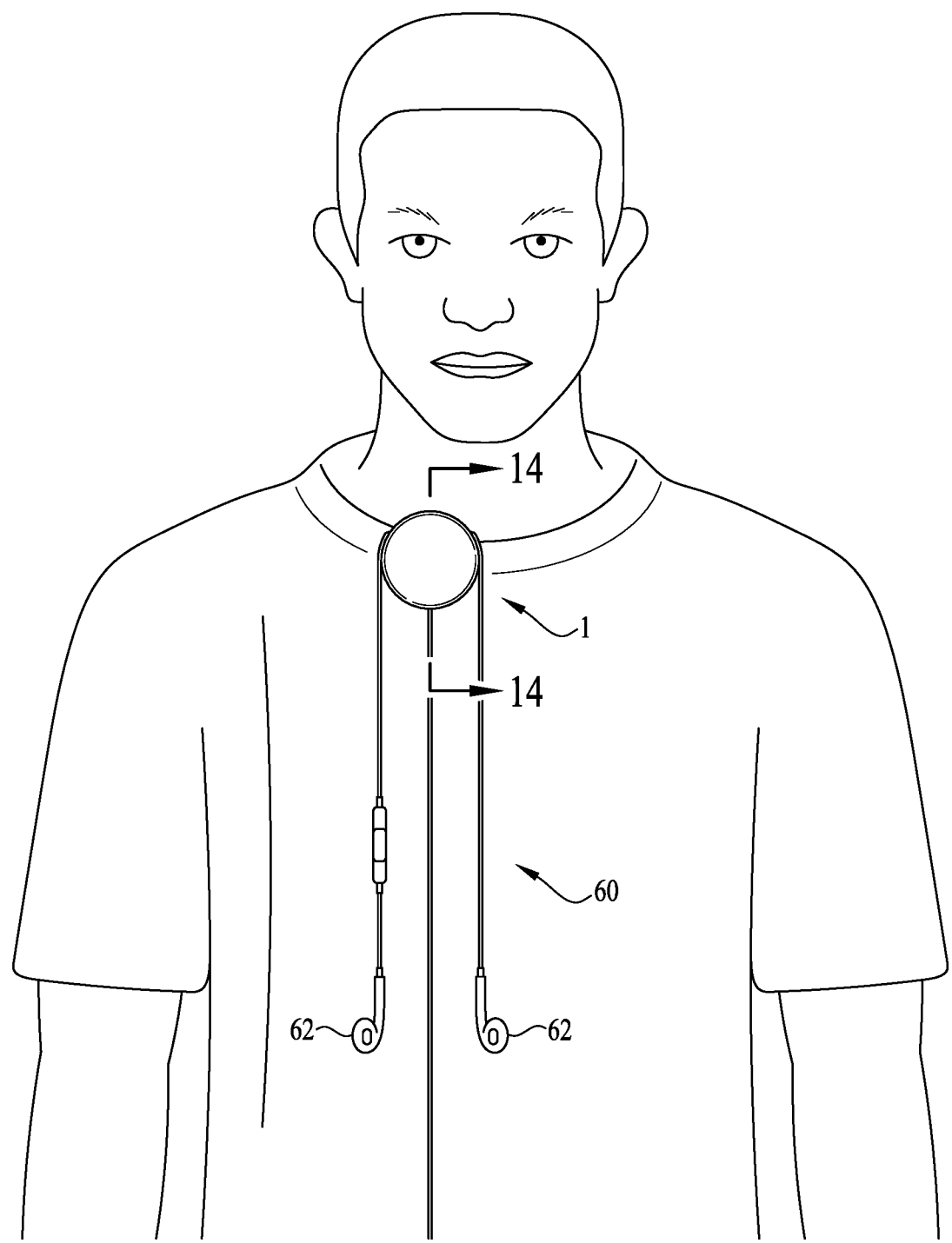
FIG. 13 is a view of the assembly according to an embodiment of the present invention with a fixed clip as secured on a user's clothing.
Figure 14:
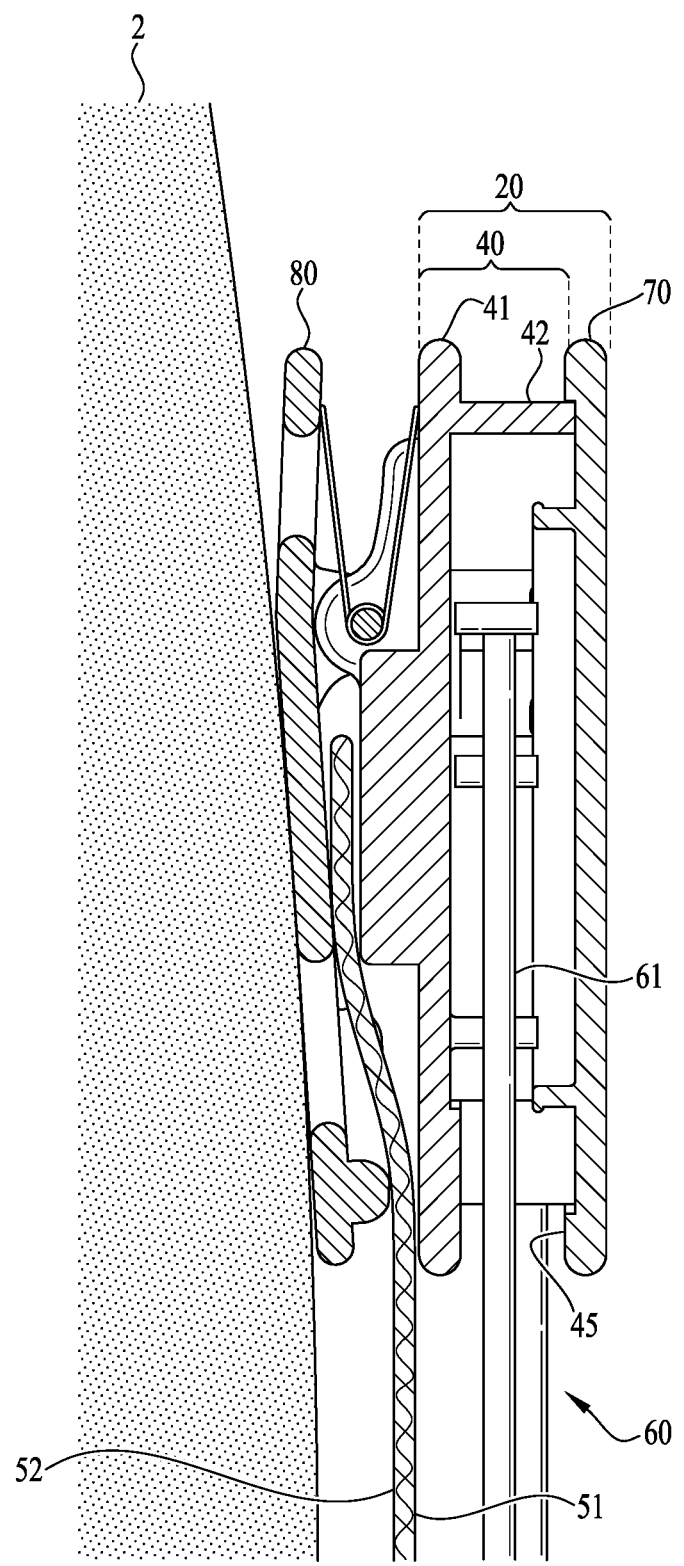
FIG. 14 is a cross-section view of the assembly according to an embodiment of the present invention as secured on a user's clothing with a fixed clip.

Particularly relating to FIG. 4-5, the receptor housing (20) is positioned on a first side of an article of clothing (51), and said fastening mechanism is positioned on a second side (52) of said article of clothing (50) and aligned opposite to said receptor housing (20).

The fastening mechanism (30) links with the receptor housing (20) so that an audio cable (60) is movably secured to the clothing (50) such that said receptor housing (20) is secured at any location on said clothing (50). The ability to position the receptor housing (20) to any position on the clothing (50) allows the invention to accommodate multiple configurations of audio cables (60) for a variety of earbud types. For example, the receptor housing (20) may be secured near a user's waistline if the audio cable (60) needs to be positioned near an electronic device in the user's pocket. On the other hand, the receptor housing (20) may be secured near a user's neck if the audio cable (60) needs to be positioned near an electronic device strapped to a user's arm while exercising.

In some embodiments, the receptor housing (20) is comprised of a base (40), wherein said base is comprised of a base plate (41) and a peripheral wall (42) located proximate to an edge of said base plate (41). The peripheral wall (42) having at least two sections (43), with a gap (44) between each said section such that there are at least two gaps (44) in said peripheral wall (42).

The receptor housing is also comprised of a base cover (70) that opens to allow said audio cable (60) to be inserted or removed from said receptor housing (20). In addition, some embodiments of the invention have at least one base post (48) that extends perpendicularly from the base plate (41). The base post (48) facilitates the attachment of the base cover (70).

The base cover (70) removably mounted to said peripheral wall (42) of said base (40) to form an enclosed housing, with said gaps (44) constituting openings (45) in said receptor housing (20). The audio cable (60), in some configurations has a cable body (61) with ends (62), is accommodated in said receptor housing (2) by positioning said cable body (61) in said enclosed receptor housing such that it extends through said openings (45). Those skilled in the art will recognized that audio cables have a myriad of configurations.

In addition, some embodiments may have a receptor housing (20) that is further customizable in design, color, and shape. The base cover (70) could be interchangeable and with different colors, logos, and designs.

The receptor housing (20) could integrate other features such as a GPS tracking device for safety, a translucent base cover (70) that can integrate LED lights and/or diode lights that flicker or flashing (for night visibility), glow in the dark or other luminescent material, reflective material, personal alarm, Bluetooth mini stereo speaker with hands-free phone capability, or video recorder. These additional features can be enclosed within the receptor housing (20) itself or mounted externally to it. Those skilled in the art will appreciate that the receptor housing could include other electronic devices could be integrated into the receptor housing to add additional functionality to embodiments of the universal assembly (1).

Referring generally to FIGS. 2-8, some embodiments of the invention have a base (40) with a first magnetic member (46) centrally located in said base plate (41). The base cover (70) has a second magnetic (71) member complementary to said first magnetic member (46).

The audio cable (60) is enclosed by the receptor housing (20) when the base cover (70) is attached to said base (40) by engaging said second magnetic member (71) with said first magnetic member (46).

Continuing with the embodiment described above, the universal assembly (1) is attached to a clothing article (50) by placing said receptor housing (20) on a first side (51) of said clothing article (50) and placing said fastening mechanism on a second side (52) of said clothing article (50), and engaging said third magnetic member (31) of said fastening mechanism (30) with said first magnetic member (46) of said base (40). As the receptor housing (20) is linked to the fastening mechanism (30) through magnetic members (46) and (31), the magnetic connection means that the receptor housing (20) is rotatable on its center axis by 360 degrees such that said an audio cable (60) can be positioned as desired at any angle on said clothing (50). In other words, the receptor housing (20) can be rotated such that openings (45) can be positioned along any angle to universally accommodate multiple configurations of audio cables (60) for a variety of earbud types. The use of magnetic members (46 and 31) to secure receptor housing (20) to the fastening mechanism (30) and the use of magnetic members (71 and 46) to secure the base cover (70) to base (40) cumulatively means that there is a stronger attachment of said universal device (1) to said clothing article (50) to the additive effect of the various magnetic members in proximity. Those skilled in the art will recognize that various configurations and numbers of magnets may be employed to achieve a stronger link such that the receptor housing (20) will be difficult to remove from the fastening mechanism (30).

Furthermore, the magnetic connection allows the receptor housing (20) to move across said clothing (50) freely, since there is not direct physical connection, such as through a button or pin. Those skilled in the art can appreciate that there are various other methods to movably secure the receptor housing (20) to the fastening mechanism (30) that do not require a physical connection between the two components.

In another embodiment of the invention, as generally described in FIGS. 9-14, the universal assembly (1) comprises receptor housing (20) having a base (40), wherein said base is comprised of a base plate (41) and a peripheral wall (42) located proximate to an edge of said base plate (41). The peripheral wall (42) having at least two sections (43), with a gap (44) between each said section such that there are at least two gaps (44) in said peripheral wall (42). The base (40) further has a clip (90) pivotally mounted to the side opposite of the peripheral wall (42). One skilled in the art may appreciate different methods of attaching the clip (90), for example, the clip (90) may also be molded directly onto to base plate (41). The base (4) is covered by a base cover (70) that opens to allow said audio cable (60) to be inserted or removed from said receptor housing (20), said base cover (70) is removably mounted to said peripheral wall (42) of said base to form an enclosed housing, with said gap (44) constituting openings (45) in said receptor housing (20).

The audio cable (60), which in some embodiments has a cable body (61) with ends (62), is accommodated in said receptor housing (2) by positioning said cable body (61) in said enclosed receptor housing such that it extends through said openings (45). To secure the universal assembly (1) to an article of clothing (50), the receptor housing (20) is positioned on an article of clothing (50) such that said clothing article (50) is between said base plate (41) and said clip (90). The receptor housing (2) is secured when base plate (41) is positioned on a first side of an article of clothing (51), and said clip (90) is positioned on a second side (52) of said article of clothing (50) and aligned opposite to said base plate (41).

The base cover (70) may be secured to the base (40) by a snap-fit groove (47), which is located adjacent to the peripheral wall (42) and runs parallel to the peripheral wall (42). In addition, some embodiments of the invention have at least one base post (48) that extends perpendicularly from the base plate (41). The base post (48) facilitates the attachment of the base cover (70). The base post (48) may also form the perimeter of the snap-fit groove (47).

The base cover has a snap-fit protrusion (72) which is complementary to said snap-fit groove (47). The base cover (70) is attached to said base (40) to form said receptor housing (20) by engaging said snap-fit protrusion (72) with said snap-fit groove (47).

In another embodiment of the invention, as generally described in FIGS. 6-8 and 13, the universal assembly (1) comprises a receptor housing (20) having a base (40), wherein said base is comprised of a base plate (41) and a peripheral wall (42) located proximate to an edge of said base plate (41). The peripheral wall (42) having at least two sections (43), with a gap (44) between each said section such that there are at least two gaps (44) in said peripheral wall (42).

The base (4) is covered by a base cover (70) that opens to allow said audio cable (60) to be inserted or removed from said receptor housing (20), said base cover (70) is removably mounted to said peripheral wall (42) of said base to form an enclosed housing, with said gap (44) constituting openings (45) in said receptor housing (20).

The audio cable (60), which in some embodiments has a cable body (61) with ends (62), is accommodated in said receptor housing (2) by positioning said cable body (61) in said enclosed receptor housing such that it extends through said openings (45). To secure the universal assembly (1) to an article of clothing (50), the receptor housing (20) is positioned on an article of clothing (50) such that said clothing article (50) is between said base plate (41) and said clip (80). More particularly, the receptor housing (20) is positioned on an article of clothing (50) such that said clothing article (50) is between said base plate (41) and said clip (90). The receptor housing (2) is secured when base plate (41) is positioned on a first side of an article of clothing (51), and said clip (80) is positioned on a second side (52) of said article of clothing (50) and aligned opposite to said base plate (41).

The base (40) also has a first magnetic member (46) centrally located in said base plate (41). The base cover (70) has a second magnetic (71) member complementary to said first magnetic member (46). The audio cable (60) is enclosed by the receptor housing (20) when the base cover (70) is attached to said base (40) by engaging said second magnetic member (71) with said first magnetic member (46).

The base (40) further has a clip (80) mounted to the side opposite of the peripheral wall (42). The clip (80) is further comprised of a third magnetic member (81) such that the clip (80) is removably attached to the opposite side of the peripheral wall (42) by engaging said third magnetic member (81) of said clip (80) with said first magnetic member (46) of said base.

In other embodiments, the clip (80) can be replaced with a material having the ability to be removably secured to the user's clothing. Such material can include an attachment means with hooks such as Velcro® or it can be composed of substance having the ability to adhere to the clothing such as a poly AB glue plastic, which can be formulated to hold several pounds of weight far beyond the needs of the current invention. Such glues can also be formulated to be easily removed from a surface such is the case with such products as Stikk Gel Pads. Moreover, any appropriate adhesive may be used that can removably secure the invention to clothing without damaging the clothing.

Figure 17:
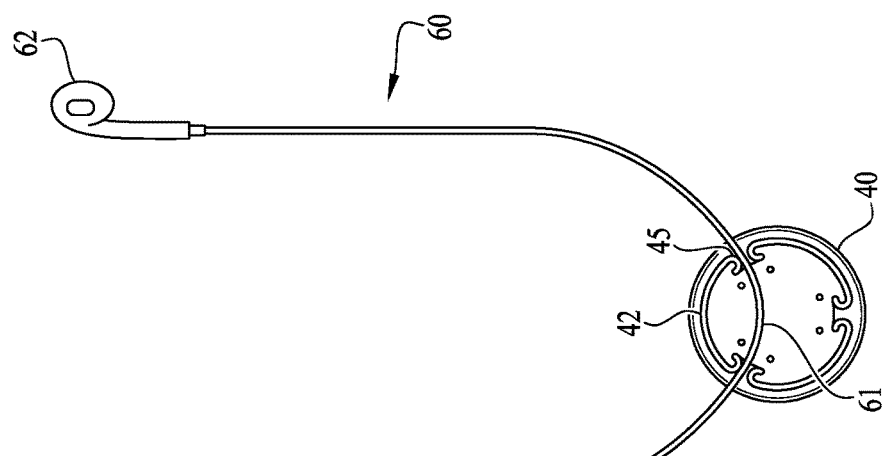
FIG. 17 is an interior view of the assembly according to an embodiment of the present invention with a two prong audio cable inserted into the receptor housing.
Figure 16:
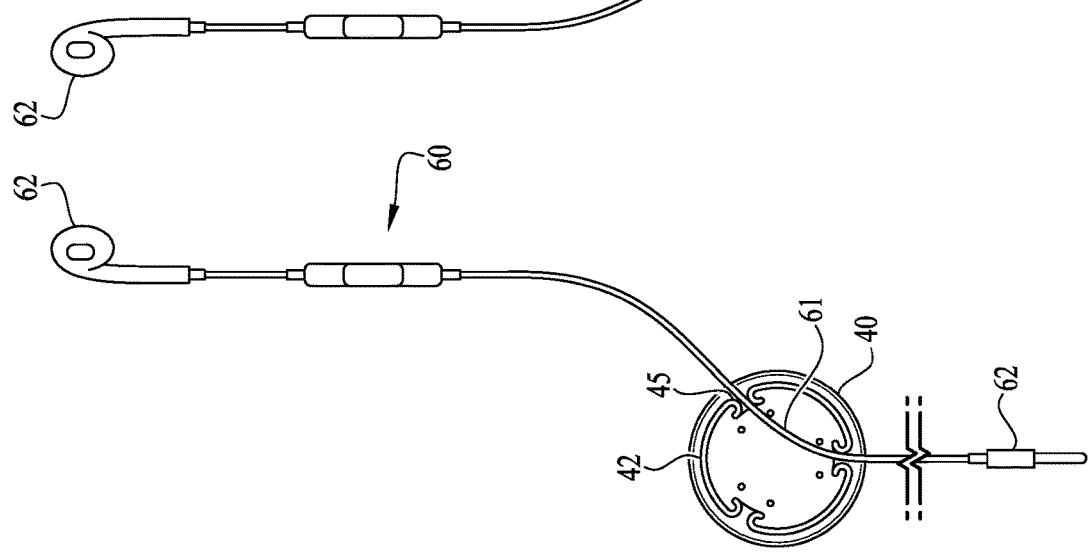
FIG. 16 is an interior view of the assembly according to an embodiment of the present invention with a two prong audio cable inserted into the receptor housing.
Figure 15:
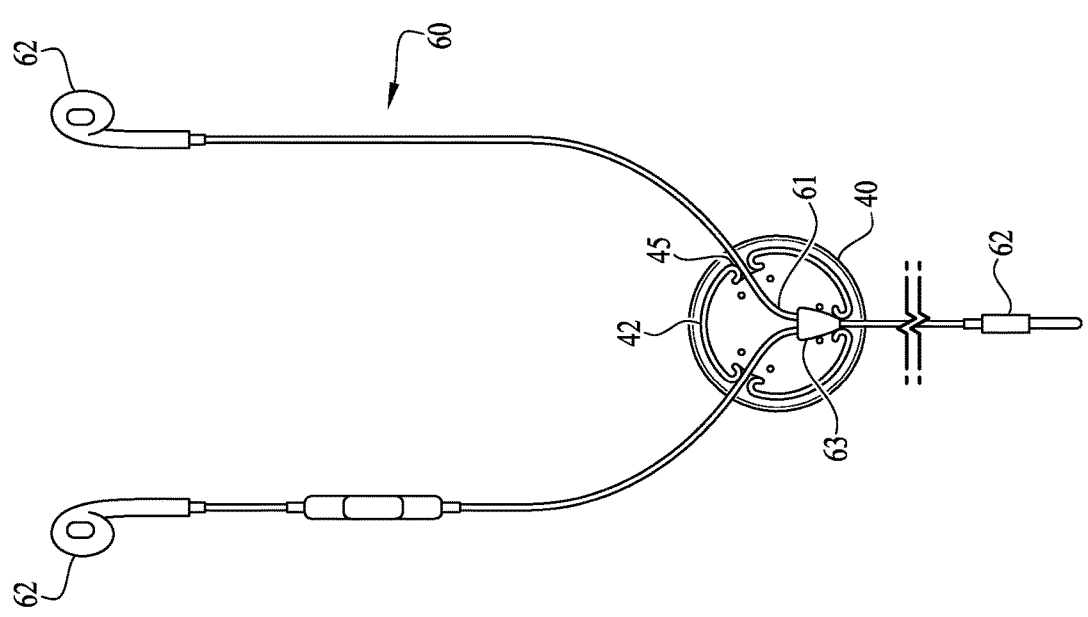
FIG. 15 is an interior view of the assembly according to an embodiment of the present invention with a three prong audio cable inserted into the receptor housing.

Embodiments of the present invention are designed to be compatible with a variety of earbud configurations, as generally shown in FIGS. 15-17. Some audio cables for earbuds have three ends (62) as shown in FIG. 15. With an audio cable (60) with three ends (62), and embodiment of the invention will have the base (40) with three openings (45) to accommodate and secure each end (62) of the audio cable (60). The Y-junction (63) where the three ends of the audio cable meet will be fully enclosed in the base (40), providing extra security. In embodiments such as the one shown in FIG. 1-3, the receptor housing (20) will rotate freely because of the magnetic linkage and allow the user to position the three ends (62) of the audio cable (60) in any position. For example, the user may prefer the cable end (62) with the audio jack to face a certain orientation to more easily plug the audio cable into an electronic device.

Likewise, some audio cables for earbuds have two ends (62) as shown in FIGS. 16-17. With an audio cable (60) with two ends (62), and embodiment of the invention will have the base (40) with two openings (45) to accommodate and secure each end (62) of the audio cable (60). In embodiments such as the one shown in FIG. 1-3, the receptor housing (20) will rotate freely because of the magnetic linkage and allow the user to position the three ends (62) of the audio cable (60) in any position. For example, the user may prefer the cable ends (62) with the audio jack in FIG. 16 to face a certain orientation to more easily plug the audio cable into an electronic device. As another example, the user may prefer the cable ends (62) with the earbuds in FIG. 17 to face a certain orientation to more easily wear the earbuds.

I claim:

1. A universal assembly for securing audio cables to clothing, said universal assembly comprising:
    a receptor housing for supporting an audio cable; and
    a fastening mechanism magnetically attachable to said receptor housing;
    wherein said receptor housing has:
        a base plate;
        a peripheral wall located proximate to an edge of said base plate, said peripheral wall having at least two sections, with a gap between each said section such that there are at least two gaps in said peripheral wall;
        a base cover that opens to allow said audio cable to be inserted in or removed from said receptor housing, said base cover removably mounted to said base plate to form an enclosed housing, with said gaps constituting openings in said receptor housing;
    wherein said audio cable is accommodated in said receptor housing by positioning said audio cable in said enclosed housing such that it extends through said openings;
    wherein said receptor housing is positioned on a first side of an article of clothing, and said fastening mechanism is positioned on a second side of said article of clothing and aligned opposite to said receptor housing;
    whereby said fastening mechanism links to said receptor housing so that said receptor housing is removably secured to said article of clothing.

2. The universal assembly according to claim 1, said receptor housing further comprising:
    a first magnetic member centrally located in said base plate;
    said base cover having a second magnetic member complementary to said first magnetic member;
    wherein said base cover is attached to said base plate to form said enclosed housing by engaging said second magnetic member with said first magnetic member.

3. The universal assembly according to claim 2, said fastening mechanism having a third magnetic member;
    wherein said universal assembly is attached to said article of clothing by placing said receptor housing on said first side of said article of clothing and placing said fastening mechanism on said second side of said article of clothing, and engaging said third magnetic member of said fastening mechanism with said first magnetic member of said base plate.

4. The universal assembly according to claim 3, wherein said receptor housing is rotatable on its center axis by 360 degrees due to a magnetic connection between said third magnetic member and said first magnetic member, such that said audio cable can be positioned as desired at any angle on said article of clothing.

5. The universal assembly according to claim 4, wherein said receptor housing is movable across said article of clothing due to said magnetic connection between said first magnetic member and said third magnetic member.

6. The universal assembly according to claim 3, wherein a combined connection of said first, second and third magnetic members create a stronger connection than either between said first and second magnetic members or between said first and third magnetic members, providing for a stronger attachment of said universal assembly to said article of clothing.

7. The universal assembly according to claim 1, wherein said base plate has a snap-fit groove located adjacent to said peripheral wall, and said base cover has a snap-fit protrusion complementary to said snap-fit groove;
    wherein said base cover is attached to said base plate to form said enclosed housing by engaging said snap-fit protrusion with said snap-fit groove.

8. A universal assembly for securing audio cables to clothing, said universal assembly comprising:
    a base having a base plate, a first magnetic member centrally located in said base plate, and a peripheral wall located proximate to an edge of said base plate, said peripheral wall having at least two sections, with a gap between each said section such that there are at least two gaps in said peripheral wall;
    a base cover removably mounted to said base, said base cover having a second magnetic member complementary to said first magnetic member;
    a fastening mechanism attachable to said base, said fastening mechanism having a third magnetic member complementary to said first magnetic member of said base;
    wherein said base is positioned on a first side of an article of clothing, and said fastening mechanism is positioned on a second side of said article of clothing such first magnetic member connects with said third magnetic member such that said base is movably secured to said article of clothing and can be secured at any location on said article of clothing;

whereby said base is rotatably connected to said fastening mechanism such that an audio cable is secured to said article of clothing and can be positioned as desired.

9. A universal assembly for securing audio cables to clothing, said universal assembly comprising:

a receptor housing having a base, said base having:

a base plate having a first magnetic member centrally located on said base plate;

a peripheral wall located proximate to an edge of said base plate, said peripheral wall having at least two sections, with a gap between each said section such that there are at least two gaps in said peripheral wall; and a clip pivotally mounted to a side of said base plate opposite of said peripheral wall;

a base cover having a second magnetic member complementary to said first magnetic member, wherein said base cover is removably mounted to said base to form an enclosed housing by engaging said second magnetic member with said first magnetic member;

wherein said base cover opens to allow an audio cable to be inserted in or removed from said receptor housing, with said gaps constituting openings in said enclosed housing;

wherein said audio cable, is accommodated in said receptor housing by positioning said audio cable in said enclosed housing such that it extends through said openings;

whereby said receptor housing is positioned on an article of clothing such that said article of clothing is between said base plate and said clip to secure said receptor housing to said article of clothing.

10. The universal assembly according to claim 9, wherein said clip has a third magnetic member;

wherein said clip is removably attached to said side of said base plate opposite of said peripheral wall by engaging said third magnetic member of said clip with said first magnetic member of said base.

* * * * *